United States Patent
Sarrafan et al.

(10) Patent No.: US 12,137,061 B2
(45) Date of Patent: Nov. 5, 2024

(54) OPPORTUNISTIC RADIO FREQUENCY TRANSMISSIONS IN A CENTRALIZED NETWORK OF SECONDARY USERS

(71) Applicant: Meteorcomm, LLC, Renton, WA (US)

(72) Inventors: Shiva Sarrafan, Mercer Island, WA (US); Arun Naidu, Woodinville, WA (US); Jim M. Elder, Seattle, WA (US)

(*) Notice: Subject to any disclaimer, the term of this patent is extended or adjusted under 35 U.S.C. 154(b) by 134 days.

(21) Appl. No.: 17/027,576

(22) Filed: Sep. 21, 2020

(65) Prior Publication Data

US 2021/0091898 A1    Mar. 25, 2021

Related U.S. Application Data

(60) Provisional application No. 62/902,953, filed on Sep. 19, 2019.

(51) Int. Cl.
| | |
|---|---|
| *H04L 5/00* | (2006.01) |
| *H04L 45/16* | (2022.01) |
| *H04W 72/0446* | (2023.01) |
| *H04W 72/0453* | (2023.01) |
| *H04W 72/30* | (2023.01) |

(52) U.S. Cl.
CPC .......... *H04L 5/0005* (2013.01); *H04L 5/0037* (2013.01); *H04L 45/16* (2013.01); *H04W 72/0446* (2013.01); *H04W 72/0453* (2013.01); *H04W 72/30* (2023.01)

(58) Field of Classification Search
CPC ..... H04L 5/0005; H04L 5/0037; H04L 45/16; H04W 72/005; H04W 72/0446; H04W 72/0453; H04W 72/041
See application file for complete search history.

(56) References Cited

U.S. PATENT DOCUMENTS

| | | |
|---|---|---|
| 568,101 A | 9/1896 | Rouse |
| 4,582,280 A | 4/1986 | Nichols |
| 4,736,371 A | 4/1988 | Tejima |
| 5,039,038 A | 8/1991 | Nichols |
| 5,065,398 A | 11/1991 | Takashima |

(Continued)

FOREIGN PATENT DOCUMENTS

| | | |
|---|---|---|
| CN | 101345726 A | 1/2009 |
| WO | 2010059312 A1 | 5/2010 |

OTHER PUBLICATIONS

AAR Manual of Standards and Recommended Practices Office Architecture and Railroad Electronics Messaging, Class C IMessaging, Standard S-9355.V1.0, Aug. 2014, 4 pages.

(Continued)

*Primary Examiner* — Basil Ma
(74) *Attorney, Agent, or Firm* — Hubbard Law, PLLC; Marc A. Hubbard

(57) ABSTRACT

In method for facilitating the more efficient opportunistic use of one or more frequency division multiplexed (FDM) channels by a two or more secondary users (SU) in a point-to-multipoint, centralized ad hoc network, one SU acts as a central node and the remaining SU acting as remote nodes. Each SU adheres to a predetermined protocol utilizing synchronized time slots in each of the channels, each time slot having at least one data transmission period and at least one primary user detection period during which no SU transmits. The central SU node determines channel availability.

26 Claims, 1 Drawing Sheet

(56) References Cited

U.S. PATENT DOCUMENTS

| | | |
|---|---|---|
| 5,267,473 A | 12/1993 | Bezos |
| 5,377,938 A | 1/1995 | Bezos |
| 5,681,015 A | 10/1997 | Kull |
| 5,720,455 A | 2/1998 | Kull |
| 5,757,291 A | 5/1998 | Kull |
| 6,072,993 A | 6/2000 | Trikha |
| 6,115,435 A | 9/2000 | Harada |
| 6,269,116 B1 | 7/2001 | Javerbring |
| 6,505,104 B2 | 1/2003 | Collins |
| 6,577,610 B1 | 6/2003 | Kronz |
| 7,042,954 B2 | 5/2006 | Ha |
| 7,467,032 B2 | 12/2008 | Kane |
| 7,742,850 B2 | 6/2010 | Kane |
| 7,808,892 B1 | 10/2010 | Babcock |
| 7,974,246 B1 | 7/2011 | Fulthorp |
| 8,032,078 B1 | 10/2011 | Donich |
| 8,098,645 B2 | 1/2012 | Yee |
| 8,279,796 B1 | 10/2012 | Cleveland |
| 8,340,056 B2 | 12/2012 | Siriwongpairat |
| 8,374,291 B1 | 2/2013 | Himsoon |
| 8,582,694 B2 | 11/2013 | Velazquez |
| 8,602,574 B1 | 12/2013 | Alvi |
| 8,605,754 B2 | 12/2013 | Siriwongpairat |
| 9,037,625 B2 | 5/2015 | Sturza |
| 9,112,735 B1 | 8/2015 | Harris |
| 9,203,558 B1 | 12/2015 | Dave |
| 9,379,576 B2 | 6/2016 | Al Jaeedi |
| 9,398,587 B1 | 7/2016 | Kong |
| 9,450,688 B1 | 9/2016 | Murphy |
| 9,628,030 B1 | 4/2017 | Naidu |
| 9,669,850 B2 | 6/2017 | Fuchs |
| 9,840,260 B2 | 12/2017 | Naidu |
| 10,091,785 B2 * | 10/2018 | Hu .................... H04W 16/14 |
| 10,160,466 B1 | 12/2018 | Potter |
| 10,224,881 B2 | 3/2019 | Naidu |
| 10,469,586 B2 | 11/2019 | Potter |
| 10,710,620 B2 | 7/2020 | Potter |
| 10,858,020 B2 | 12/2020 | Naidu |
| 11,540,279 B2 | 12/2022 | Sarrafan |
| 2002/0003846 A1 | 1/2002 | Khayrallah |
| 2003/0103589 A1 | 6/2003 | Nohara |
| 2004/0001561 A1 | 1/2004 | Dent |
| 2005/0149339 A1 | 7/2005 | Tanaka |
| 2006/0168500 A1 | 7/2006 | Whinnett |
| 2007/0170314 A1 | 7/2007 | Kane |
| 2007/0236079 A1 | 10/2007 | Kull |
| 2009/0074101 A1 | 3/2009 | Tang |
| 2009/0310548 A1 * | 12/2009 | Kwon .................... H04W 4/20 |
| | | 370/329 |
| 2010/0020235 A1 | 1/2010 | Bouillet |
| 2010/0097952 A1 * | 4/2010 | McHenry ............ H04W 16/14 |
| | | 370/252 |
| 2010/0130124 A1 | 5/2010 | Teeter |
| 2012/0246692 A1 * | 9/2012 | Ghosh .................. H04W 16/14 |
| | | 725/118 |
| 2013/0136075 A1 | 5/2013 | Yu |
| 2013/0294356 A1 * | 11/2013 | Bala ..................... H04W 16/14 |
| | | 370/329 |
| 2014/0301505 A1 | 10/2014 | Miyazaki |
| 2015/0098514 A1 | 4/2015 | Tamma |
| 2015/0111595 A1 * | 4/2015 | Yoo ....................... H04W 72/04 |
| | | 455/454 |
| 2017/0088153 A1 | 3/2017 | Fernandes |
| 2018/0019831 A1 | 1/2018 | Zhang |
| 2019/0230675 A1 * | 7/2019 | Papa .................. H04L 12/4633 |
| 2021/0091898 A1 * | 3/2021 | Sarrafan ................ H04L 45/16 |
| 2022/0006601 A1 | 1/2022 | Zhu |
| 2022/0182179 A1 | 6/2022 | Ghazi-Moghadam |
| 2022/0194443 A1 | 6/2022 | Covari |
| 2022/0201587 A1 | 6/2022 | Edmondson |
| 2023/0138011 A1 | 5/2023 | Naidu |

OTHER PUBLICATIONS

AAR Manual of Standards and Recommended Practices Office Architecture and Railroad Electronics Messaging, Class D Messaging, Standard S-9346.V1.0, 2010, 34 pages.

AAR Manual of Standards and Recommended Practices Office Architecture and Railroad Electronics Messaging, Edge Message Protocol, Standard S-9354.V2.0, Implemented Oct. 2018, 18 pages.

Fatih Genc et al., "On the Optimum Ring Ratio Determination for 16-DAPSK Modulation in OFDM Systems", 2014 IEEE 22nd Signal Processing and Communications Applications Conference (SIU 2014), 4 pages.

Fredric J. Harris et al.; "Digital Receivers and Transmitters Using Polyphase Filter Banks for Wireless Communications"; IEEE Transactions on Microwave Theory and Techniques; vol. 51, No. 4; Apr. 2003; pp. 1395-1412; DOI: 10.1109/TMTT.2003.809176.

Hewavithana et al., "Soft Decisions for DQPSK Demodulation for the Viterbi Decoding of the Convolutional Codes", ICASSP 2003, 4 pages.

Meteorcomm LLC, "ITCnet Common Air Interface", 2013, 46 pages.

Meteorcomm LLC, "ITCR 1.1 System Architecture Specification", Doc Revision: 4.0, Doc No. 00002542-A, 2012, 88 pages.

Progress Rail, "Guardian End-of-Train Device", progressrail.com, Oct. 14, 2020, 2 pages.

Siemens, "Rail Automation, End of Train Device, Locomotive Onboard Equipment", usa.siemens.com/rail-automation, 2015, 2 pages.

Final Report, PTC Radio Frequency Network Design for Dense Urban Areas, U.S. Department of Transportation, Federal Railroad Administration, Office of Research, Development and Technology, Apr. 2018, 163 pages.

Hartong, M., Securing Postive Train Control Systems, Conference: Critical Infrastructure Protection, Post-Proceedings of the First Annual IFIP Working Group 11.10 International Conference on Critical Infrastructure Protection, Dartmouth College, Hanover, New Hampshire, USA, Mar. 19-21, 2007.

Office Action (Notice of Allowance and Fees Due (PTOL-85)) dated Mar. 22, 2023 for U.S. Appl. No. 17/546,031 (pp. 1-8).

* cited by examiner

OPPORTUNISTIC RADIO FREQUENCY TRANSMISSIONS IN A CENTRALIZED NETWORK OF SECONDARY USERS

RELATED APPLICATION

This application claims the benefit of U.S. Provisional Application No. 62/902,953 filed Sep. 19, 2019, which is incorporated by reference herein for all purposes.

FIELD OF INVENTION

The subject matter of the following disclosure generally pertains to the operation of radio networks by secondary users making opportunistic use of portions of frequency bands unoccupied by primary users.

BACKGROUND

To improve the efficiency of the use of underutilized radio frequency bands or spectrum, it has been proposed to allow the opportunistic use of "white spaces" radio frequency bands that are set aside or assigned to specific uses that may not fully utilize them. Radios of primary users (PU), who are users that have a right to operate in the given radio frequency band, such as by reason of having a license, would still have priority to transmit in the frequency band. However, radios of secondary users (SU) would be allowed to make use of the frequency band for transmissions if the transmissions do not interfere with the primary users of the radio frequency band. To avoid interference, secondary users must find white spaces for transmissions by monitoring the frequency band for primary user transmissions. So-called "cognitive radios," which are able to monitor a communications environment and adapt to it, can be used for this purpose.

SUMMARY

Disclosed are methods for facilitating the opportunistic use of one or more channels in a frequency band by a group of two or more secondary users (SU) that have formed a point-to-multipoint, centralized ad hoc network.

In examples of the disclosed methods, two or more secondary users form a centralized, ad hoc wireless network over which the secondary users communicate by transmitting signals within predefined frequency division multiplexed (FDM) channels in a radio frequency band that are not currently occupied by a primary user—so-called "white spaces." Each of the channels occupies a sub-band within the frequency band and may, optionally, include narrowband and wideband channels that overlap multiple narrowband channels. When implementing the methods, each secondary user in the network adheres to predetermined one or more protocols. The methods enable more efficient use of white spaces for transmitting data and/or lower the risk of interfering with any primary use of the frequency band when transmitting data.

DETAILED DESCRIPTION OF EXEMPLARY EMBODIMENTS

In the following description, like numbers refer to like elements.

To make use of an underutilized frequency band, secondary users form a wireless network. The network could be ad hoc but does not have to be. It may utilize a point-to-multipoint topology with a node that acts as a centralized node. A representative example of a secondary user (SU) network comprises a centralized node and at least one or more remote nodes. The centralized node will typically have a fixed location. It may have a connection with another network—wired or wireless. If the central SU node's location is fixed, the network covers a fixed geographic area that is referred to as its coverage area. If connected to another network, the centralized node may serve as a bridge or gateway for forwarding messages (such as data packets) from SU nodes on the SU network to destinations or endpoints on another network, and to SU nodes on the SU network from sources outside the SU network. Each of the remote SU nodes may be fixed or mobile. When a remote SU node joins a SU network, it is said to subscribe to the SU network. The size of a SU network could, if desired, adjust dynamically as mobile remote users enter or leave the coverage area of the SU network.

Figure 1:
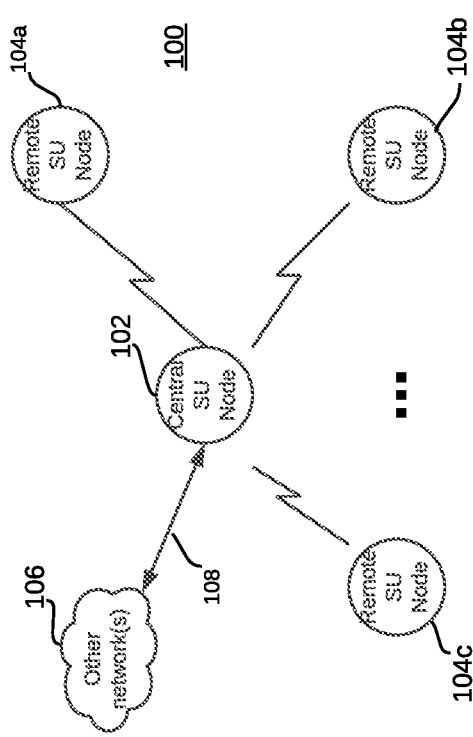
FIG. 1 is a simplified schematic representation of a secondary user network.

FIG. 1 is a schematic drawing of a simplified, representative example of a secondary user wireless network—which will be referred to as a "SU network"—with which the methods described below could be used. In practice, a SU network may be more complex and have more nodes. The representative example is not intended to suggest any limitation on the topology or other features of a wireless SU network that makes use of the methods described below. The wireless network 100 includes a plurality of SU nodes, at least one of which is a central SU node. In the illustrated example, SU node 102 acts as a central SU node and SU nodes 104a to 104n are subscribing remote SU nodes, where n is the number of subscribing remote SU nodes. The SU nodes in this example form a point to multi-point network.

Each SU node comprises at least one transceiver, meaning a radio that has a receiver and a transmitter for receiving and transmitting radio frequency (RF) signals in at least one frequency band or sub-band, and logic in the form of, for example, programmed processors for carrying out the automated methods described herein. Only one transceiver is required. With a transceiver, a SU node may monitor primary user (PU) activity within one or more, and preferably all, of the channels in a frequency band. It may also process its own signal and transmit it in the channels of operation of the SU network that it subscribes to. And, it may receive signals from other secondary users in at least one if not all of the channels in the frequency band. The channels of operation are a predefined set of channels that comprise all or a subset of one or more channels in the frequency band over which a SU network operates or may operate.

Each of the primary user channels could carry, or be modulated by, a baseband signal that the transceiver is capable of demodulating from the carrier. However, a particular primary user channel could carry a signal that a SU transceiver is not programmed or otherwise set up to demodulate or decode. Thus, it is preferred, but not required, that a SU node monitor check for primary user occupancy of a channel by detecting the energy level of that channel and deciding whether it is occupied by comparing it to its noise level.

In one representative embodiment of a transceiver for a SU node, the transceiver comprises a software-defined radio. To detect transmissions of signals by primary users within a frequency band or within one or more predefined channels of the frequency band, the software-defined radio may, in a representative example, implement a bank of filters, one for each channel in the frequency band, to channelize the received signal for the frequency band and detect the energy of any transmissions in the channel. The transceiver may make frequent measurements of the energy in each channel that is being monitored and compare each measurement to a threshold energy level. The threshold may be dynamically varied based on measured levels of noise, particularly thermal noise. If a channel's measured energy exceeds the threshold, the channel is deemed as occupied or in-use. One advantage of this type of detection is that it does not require a priori knowledge of the characteristics of the transmitted signal, such as, in the case of a digital signal, the characteristics of a PU's digital signal such as modulation technique and preambles. It can also be used to detect analog transmissions.

To reduce the risk of interference with primary user transmissions and/or to increase the efficiency of the use of available white spaces by a SU network, the transceiver of each of the SU nodes comprising a SU network will follow one or more predetermined protocols and perform one or more of the methods described below.

A transceiver of a SU node may only transmit on a channel when white space is available, which is when a primary user is not occupying a channel. According to one method, the centralized SU node 102 and each subscribing remote SU node 104 regularly checks each channel of operation, or all of the channels, of a frequency band for transmissions of primary users. Subscribing remote SU nodes 104 transmit to the centralized node a report on the occupancy of a channel based on its decision of whether or not a particular channel is occupied. The centralized SU node 102 then, based on its own decision on channel occupancy and any reports of channel occupancy from remote SU nodes, transmits a message on the channel or, alternatively, another designated channel, that can be received by all of the subscribing remote SU nodes about availability of white space on the channel for data transmission and, in particular, whether a channel is available for a remote SU node to transmit data.

In the methods described below, each SU transceiver adheres to a protocol that defines a predetermined framing structure for each channel. Transmissions take place in synchronized time slots. Each transceiver may, for example, synchronize to a predetermined—for example, set by a protocol—or otherwise source of universal time agreed-upon by the SU network, with the start of each time slot being determined by a protocol followed by each of the transceivers. In one representative example, the timing for the time slots is synchronized using pulse per second (PPS) signals using Global Navigation Satellite System (GNSS).

Figure 2:
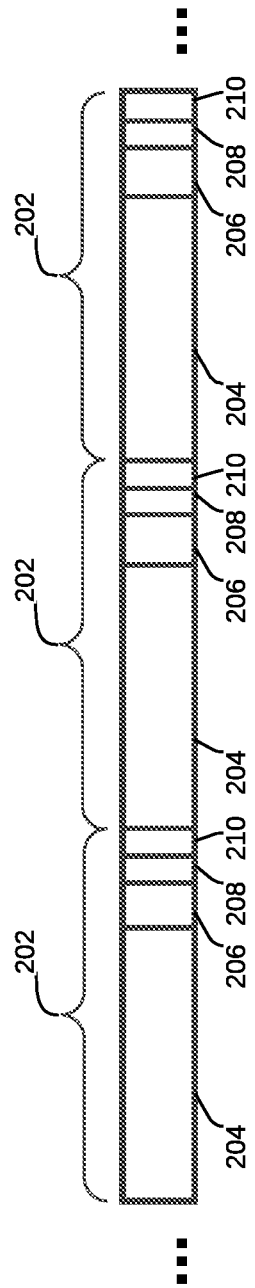
FIG. 2 is a schematic representation of a representative, simplified time slot structure for a secondary user network.

FIG. 2 illustrates a simplified, representative example of a time slot 202 for a channel of operation of a SU network. The figure actually shows a series of time slots 202 for a given channel of operation, the beginnings of each of the time slots occurring at a regular interval. Each time slot is segmented or divided into a plurality of periods. In representative example that is illustrated, each time slot includes four types of time periods, though it could, in alternative embodiments, have fewer or more than four types of time periods. The basic time periods comprise a period during which data of any type can be transmitted, including real time data such as voice and video, by any of the SU nodes, and a period during which none of the SU nodes in the SU network (or, more universally, any SU node trying to make opportunistic use of the frequency band) transmit. Furthermore, the example includes at least one period during which control messages may be sent by at least the central node and, preferably, at least two such periods, one of which is reserved for only the central node to send control messages to the SU nodes in the network. The duration of each of the periods in a time slot do not need to be equal. Preferably, the data transmission period is longer than any of the other periods. The length or duration of each time slot and the offset of each period within a time slot is predetermined by a protocol implemented by the transceivers and associated processors at each of the SU nodes that form the network.

In the representative example, the first type of a period is one in which data may be transmitted by a SU node, either one of the remote SU nodes 204 or the central SU node 202. This period will be a data transmission period. The SU node that is transmitting during this period without colliding with other transmissions is said to control or to occupy the channel.

A second type of period, which this description will refer to as a detection period, is one during which at least the central node and, in another embodiment, the central node and at least one remote SU node—and preferably all subscribing remote SU nodes—check for primary user transmissions. None of the SU nodes may transmit during this period. Prohibiting secondary user transmissions improves detection of primary user transmissions and allows for more reliable detection of primary user transmissions using methods described herein. Regular and frequent checking for primary user occupancy of a channel reduces the probability of interference between primary and secondary use of the channel.

A third type of period is reserved for remote SU nodes 204 to transmit control information, or a control message, to the central SU node 202. The message may take the form of, for example, one or more control packets. These periods will be referred to as remote control periods.

A fourth type of period, which will be referred to as a central control period, is reserved for a central SU node to transmit signals containing one or more control messages to remote SU nodes in the SU network. The messages contain control information organized, for example, into one or more control packets.

In a representative example of successive time slots 202 in FIG. 2, each time slot comprises four periods, one of each of the types described above: a data transmission period 204, a detection period 206, a remote control period 208, and a central control period 210.

The data transmission period 204 is the only period in the example during which the remote SU nodes and the central SU node may transmit data. However, data transmission is permitted in a particular time slot of a channel—and then only during the data transmission period—if it is a channel of operation and if it is available for that time slot. A channel is available if it is not currently occupied by a primary user (or treated by the central SU node as being occupied by a primary user) and, in an embodiment in which a time slot may be reserved, the time slot has not been reserved for use by another SU node. Only one SU node in the network may transmit during the data transmission period. In one embodiment, secondary users interested in transmitting during a data transmission period contend for the opportunity to transmit. When contending for the opportunity to transmit, there is no requirement for planning.

In alternative embodiment, a secondary user that is transmitting in a data transmission period and has control over the channel may declare a remaining number (or, alternatively, a total number, of slots) it requires for completing its transmission. This may be done during the data transmission period or in the immediately following remote control period. The declaration is treated as a request to the central SU node to reserve the channel for the remaining number of time slots. The central SU node may, in response, reserve the channel for that remote SU node for the requested number of additional slots by sending one or more control packets to the remote SU nodes during the next central control period 210 (discussed more below.) The remote SU nodes will not contend for transmission of data during a reserved time slot, and the time slot will be considered unavailable to the SU node that last transmitted.

Optionally, number of successive time slots for which a SU node may reserve or take control of a channel for data transmission is limited by a pre-configured maximum number of successive time slots, after which the secondary user is required to stop transmitting and relinquish control over the channel.

The throughput rate of a successful data transmission of a SU node occupying n time slots, subject to a maximum of M time slots, can be calculated as:

$$\text{Throughtput Rate}_n = \frac{\min(n, M)}{e + \min(n, M) - 1}$$

The Poisson Distribution for the probability of a node having n slots to transmit is:

$$P(n) = e^{-\lambda}\left(\frac{\lambda^n}{n!}\right)$$

Where $\lambda$=mean available number of slots to transmit at a node. Assuming a Poisson distribution, the probably of a successful transmission by a node as a function of the number of time slots n, subject to an M slot limit, is:

$$P(\text{success}) = \sum_{n=1}^{\infty} e^{-\lambda}\left(\frac{\lambda^n}{n!}\right)\frac{\min(n, M)}{e + \min(n, M) - 1}$$

In a representative embodiment, a SU node's transmission of a packet during a data transmission period must finish by the end of the data transmission period; it may not use multiple time slots to transmit a packet. It may contain additional complete packets. Transmission of packets across multiple time slots is not permitted. The total length of the transmission of one or more packets by a SU node during the data transmission period may not exceed a designated maximum allowable length of the data transmission period. However, the actual transmission may be shorter than the entire period. Thus, the length of the transmission may vary up to the maximum allowable length. Each of the data packets may be of the same or varying lengths.

The detection period 206 is a period in a time slot 202 during which none of the SU nodes are permitted to transmit in any of the channels of operation or, alternatively, in any of the channels in the frequency band. Silence is observed by all of the SU nodes in the network. The period is used to assess whether there is any potential primary user activity in one or more of the channels of operation for a network. With no SU nodes transmitting, detecting primary user transmissions by sensing energy levels within each of the channels will be more accurate. If a potential primary user transmission is detected in a channel, SU nodes in the SU network cease any further data transmissions in the channel until the channel is in an idle state, meaning that at least the central node has determined that a primary user is no longer occupying the channel within the SU network's coverage area.

In one embodiment, the central SU node and at least one of the remote SU nodes in the network listen or check for primary user transmissions in at least the channels of operation of the SU network. In another embodiment, the central node and each of the remote SU nodes in the SU network are required to check, and will check, for primary user transmissions during each detection period in each of the channels of operation of the network, and more preferably in all of the channels of the frequency band using a wideband sensing scheme. In this embodiment, the remote SU nodes are part of a cooperative sensing scheme that reduces the probability of interference with a primary user node that is "hidden" from the central SU node because the primary user radio emits signals that are too weak to be detected by the radio of the central SU node. The central SU node uses remote detection reports from remote SU nodes as well as its own sensing or detection results to determine whether a primary user occupies a channel and whether secondary use of a channel by the SU network should cease. Further transmission in the channel by SU nodes stop until another white space is detected. For example, in one implementation, for a channel to be declared as idle or unoccupied by a primary user after primary user occupancy was detected, the central SU node must not detect a primary user transmission in the channel for at least one time slot, and no remote SU node must report to the central SU node detection of a primary user transmission in the channel for the same time slot(s).

A representative embodiment of a SU transceiver that implements a wideband sensing scheme simultaneously will sense the energy in each of the channels across the entire frequency band that includes the channels of operation of the SU network. This may be done by, for example, digitizing, with an analog to digital converter, a received RF (or an IF derivative of it) signal for the entire frequency band to create a digital RF or IF signal comprised of a series of time-dependent samples. The samples are then processed using a bank of low-leakage bandpass filters employing polyphase decomposition, which channelize the digitized signal. The transceiver then computes the energy levels of each of the channels and applies detection criteria to the computed energy levels in each channel to determine whether computed energy level is noise or indicative of a signal. Each channel is classified as either noise (i.e., white space) or signal (i.e., occupied).

The remote control period 208 is a period during which a remote SU node may transmit a message to the central SU node, preferably, but not necessarily, in the form of a control packet. The central SU node may assume a transmission made during this period is a message intended for it. For example, a remote SU node may use this period to transmit an acknowledgement of a unicast data packet received from the central SU node. A remote SU node may also, for example, transmit a message to the central node that informs a central SU node of any primary user activity that it has detected during the prior detection period. Control packets are not, however, transmitted if the central SU node has informed the remote SU nodes that the channel is occupied by a primary user. In case of a collision due to more than one remote SU node transmitting during the remote control period, the central SU node may assume that there is primary user activity in that channel and decide that the channel is occupied by a primary user to avoid the possibility of interference.

During the central control period 210, only the central SU node is allowed to transmit. Remote SU nodes will not transmit during this period. The central SU node may use this period to transmit control information to remote SU nodes. Control information from the central SU node may include one or more of the following: acknowledgements for unicast packets received from a remote SU node since the last control period; and information indicating the availability of the next time slot as white space or reserved space.

The central SU node will not transmit control packets for a channel if it has determined that during the preceding detection period a primary user occupies the channel. Like the remote SU nodes, it remains inactive in a channel and does not broadcast as long as it is detecting PU activity in the channel. It may resume transmitting control packets once it determines that the channel is available for secondary user activity.

In one embodiment, if the channel remains available for data transmission during the next time slot, the central SU node will not transmit a control packet. In another embodiment, the central SU node may broadcast information, which may be in the form of a control packet, to all SU nodes that indicate that the data transmission period in the next time slot is reserved for the last remote SU node in control of the channel if that remote SU has not yet transmitted all of its packets. It may also broadcast information to the remote SU nodes that it has reserved the data transmission period for it to make a transmission. The control packet from the central SU node may, optionally, notify the subscribing remote SU nodes of the channel that the central SU node will use to transmit data in the data transmission period 204 of the next time slot. This process will allow the central SU node to transmit both unicast and broadcast packets with a much higher chance of success.

Transmissions from SU nodes in a channel of operation use a waveform that secondary user nodes receiving the transmission are capable of demodulating and decoding. The signal outputs of a demodulator of the transceiver at a central SU node is of interest during each data transmission period and remote control period. Therefore, outputs from transmissions during other periods will be or, optionally, can be, disregarded by a central SU node. The signal outputs of a demodulator of the transceiver at a remote SU node are of interest during each central control period. In one embodiment of the methods, remote SU nodes may ignore outputs from their transceivers' demodulators during other periods.

The representative example of time slot 202 is not intended to imply that the time slot may only be one of each of these periods or that the periods within a time slot have a particular order or length, though there are advantages to the order the periods as shown. Furthermore, a time slot may have more than one of the types of periods or have additional types of time periods. Although having each time slot be identical has advantages, some of the methods described herein could also be implemented with time slots that are not identical in terms of how each time slot is segmented into periods, the types of periods that are included, and/or the duration of the time slot and/or each of its periods. The order and format of the time slots could follow a predetermined protocol.

The foregoing description is of exemplary and preferred embodiments. The invention, as defined by the appended claims, is not limited to the described embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated or described structures or embodiments.

What is claimed is:

1. A method for opportunistic use by a secondary user (SU) node that comprises a transceiver of at least one frequency division multiplexed (FDM) channels in a frequency band in which primary users have priority of use, the SU node being one of a group of SU nodes forming a wireless network that comprises at least one central SU node and a plurality of remote SU nodes, the SU node comprising a transceiver and programmed logic for executing the method, the method comprising:
   the SU node transmitting data to other SU nodes in the group in at least one of the FDM channels only during one or more predefined periodic data transmission periods synchronized to all of the SU nodes in the group; and
   the SU node never transmitting a signal in the at least one of the FDM channels during a predefined, periodic primary user detection period synchronized to all the SU nodes in the group.

2. The method of claim 1, further comprising checking with the transceiver each of at least one of the FDM channels for primary user transmissions during the primary user detection period.

3. The method of claim 2, wherein checking comprises the transceiver simultaneously sensing all of the FDM channels in the frequency band to detect primary user transmissions.

4. The method of claim 2, wherein checking comprises the transceiver sensing the energy level in each of one or more of the FDM channels and detecting primary user transmissions are present by comparing the sensed energy level to a threshold noise energy level.

5. The method of claim 2, wherein the SU node is a remote SU node and transmits during a periodic remote control period a report of primary user detection when a primary user is detected in at least one of the FDM channels.

6. The method of claim 2, wherein the SU node is a central SU node that receives at least one report of detection of primary user occupancy of at least one of the one or more FDM channels from a remote SU node, and wherein the central SU node decides whether at least one of the one or more FDM channels is occupied based on its detection of primary user occupancy of at least one of the FDM channels and at least one report.

7. The method of claim 1, wherein each of the SU nodes in the group are synchronized to predefined, periodic time slots for transmissions, and each time slot is segmented into a plurality of periods, the plurality of periods comprising at least the data transmission period and the primary user detection period.

8. The method of claim 7, wherein the predefined periodic time slots are based on a universal time to which all of the SU nodes in the group synchronize.

9. The method of claim 1, wherein,
   the plurality of periods further comprises a remote control period;
   the SU node is a remote SU node; and
   the SU node transmits only control information during the remote control period.

10. The method of claim 1, wherein each of the SU nodes in the group are synchronized to predefined, periodic time slots for transmissions, and each time slot is segmented into a plurality of periods, the plurality of periods comprising at least the data transmission period, the primary user detection period, a remote control period during which remote SU nodes transmit control information, and a central control period during which the central SU node transmits control information.

11. The method of claim 10, wherein the SU node is a remote SU node and the SU node transmits only control information during the remote control period.

12. The method of claim 11, wherein,
the transceiver of the remote SU node checks at least one of the one or more FDM channels for primary user transmissions during the primary user detection period;
the transceiver of the remote SU node transmits control information during the remote control period indicating detection of channel occupancy.

13. In a network of secondary user (SU) nodes operating in a frequency band containing a plurality of frequency division multiplexed (FDM) channels, of which primary users have priority of use, the network comprising a central SU node and a plurality of remote SU nodes, wherein each of the SU nodes is comprised of a transceiver; a method for opportunistic use by any one of the remote secondary user (SU) nodes of one of the FDM channels comprising:
synchronizing to predefined, periodic time slots adhered to by all SU nodes in the network, each time slot being segmented into a plurality of periods, the plurality of periods comprising one or more of each of the following types of periods: a data transmission period during which data may be transmitted by a secondary node, a primary user detection period during which none of the SU nodes may transmit, and a central control period during which only the central node may transmit;
after receiving a signal from the central SU during a central control period that indicates that white space is available in the FDM channel, contending to transmit data in the FDM channel during a first data transmission period of a subsequent time slot without requesting reservation; and
not transmitting a signal during any primary user detection period and any central control period.

14. The method of claim 13 further comprising transmitting an indication during the transmission of data that an additional number of time slots are required to complete the transmission.

15. The method of claim 14, further comprising, if the transmission of data was successful during the data transmission period of the time slot and an additional time slot was requested to continue the transmission of data, continuing data transmission in the data transmission period in the next time slot; and not continuing the transmission of data if the transmission of data during the data transmission period was not successful.

16. The method of claim 15, wherein the remote SU node continues to transmit data in a transmission period of the next time slot if a message transmitted by the central node during a control period that precedes the data transmission period in the next time slot indicates that the next time slot is reserved.

17. The method of claim 13, further comprising not transmitting data in a data transmission period in response to receiving from the central SU node a control message during one of at least one of the control periods that precedes the data transmission period indicating primary user occupancy of the channel.

18. The method of claim 17, further comprising, after receiving a message from the central SU node of a control message indicating primary user occupancy of the FDM channel, receiving during at least one of the central control periods of a signal indicating availability of the FDM channel and contending for transmission in the data transmission period of a subsequent time slot.

19. In a network of secondary user (SU) nodes operating in a frequency band containing a plurality of frequency division multiplexed (FDM) channels, of which primary users have priority of use, the network comprising a central SU node and a plurality of remote SU nodes, a method for opportunistic use of one of the FDM channels by the central secondary user (SU) node comprising:
synchronizing to predefined, periodic time slots adhered to by all SU nodes in the network, each time slot being segmented into a plurality of periods, the plurality of periods comprising one or more of each of the following types of periods: a data transmission period during which data may be transmitted by a secondary node, a primary user detection period during which none of the SU nodes may transmit, and a central control period during which only the central node may transmit;
checking the FDM channel for primary user transmissions during at least one primary user detection period;
if no primary user is detected, transmitting during a central control period a message indicating that the FDM channel is unoccupied; and otherwise not transmitting an indication that the FDM channel is unoccupied.

20. The method of claim 19, wherein the plurality of periods comprises a remote control period, and wherein the method further comprises:
receiving a report during a remote control period from a remote SU node of a detection of occupancy of the FDM channel;
deciding based on the report and checking whether the FDM channel is occupied;
if the FDM channel is occupied, transmitting during a central control period a message indicating that the FDM channel is occupied; otherwise, not sending in the message an indication that the FDM channel is occupied.

21. The method of claim 19, wherein the method further comprises receiving a request from a remote SU node transmitting data in a data transmission period of a first time slot to retain control over the channel during at least one subsequent time slot to finish the transmission of data.

22. The method of claim 21, wherein, in response to the request, the central SU node transmits in a next central control period an indication that the next time slot is reserved.

23. The method of claim 22, wherein the central node does not transmit the indication that the next time slot is reserved if the remote SU node requesting the reservation does not successfully complete transmission of data during the first time slot.

24. The method of claim 22, wherein the central node does not transmit the indication that the next time slot is reserved if the central SU node intends to transmit data during at least one subsequent time slot.

25. The method of claim 22 wherein the central node does not transmit the indication that the next time slot is reserved if the central node determines that the channel is occupied by a primary user.

26. The method of claim 22 wherein the central node does not transmit the indication that the next time slot is reserved if the central node determines that the remote SU node requesting a reservation of the time slot has met or exceeded a predetermined limit on the number of successive time slots that can be reserved.

* * * * *